US009811983B2

(12) United States Patent
Bartosik

(10) Patent No.: US 9,811,983 B2
(45) Date of Patent: Nov. 7, 2017

(54) GAMING MACHINE, SYSTEM AND METHOD FOR PLAYING A FEATURE GAME

(71) Applicant: Novomatic AG, Gumpoldskirchen (AT)

(72) Inventor: Oliver Bartosik, Guntramsdorf (AT)

(73) Assignee: Novomatic AG, Gumpoldskirchen (AT)

( * ) Notice: Subject to any disclaimer, the term of this patent is extended or adjusted under 35 U.S.C. 154(b) by 686 days.

(21) Appl. No.: 14/287,719

(22) Filed: May 27, 2014

(65) Prior Publication Data

US 2015/0348357 A1 Dec. 3, 2015

Related U.S. Application Data

(63) Continuation of application No. 13/022,702, filed on Feb. 8, 2011, now abandoned.

(Continued)

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/34*** | (2006.01) |
| ***G07F 17/32*** | (2006.01) |

(52) U.S. Cl.

CPC .............. *G07F 17/34* (2013.01); *G07F 17/32* (2013.01)

(58) Field of Classification Search

CPC . G07F 17/3211; G07F 17/3213; G07F 17/326

See application file for complete search history.

(56) References Cited

U.S. PATENT DOCUMENTS 8,070,586 B1 * 12/2011 D'Avanzo ........... G07F 17/3211 463/16

2003/0199295 A1 * 10/2003 Vancura .............. G07F 17/3232 463/16

(Continued)

FOREIGN PATENT DOCUMENTS

EP 1873710 A2 1/2008

*Primary Examiner* — Milap Shah

*Assistant Examiner* — Jason Pinheiro

(74) *Attorney, Agent, or Firm* — Kevin H. Fortin

(57) ABSTRACT

A gaming machine, system and method includes a housing having a user interface, display, preferably a lower display and an upper display, and a controller preferably mounted in the housing and in communication with the display. The controller enables standard game play mode until the occurrence of a predetermined event, such as the appearance of preferably three scatter symbols. Upon occurrence of the predetermined event, the controller enables feature game play mode where display presents a plurality of feature game symbols, and a symbol selection pointer, and optionally presents a landscape including at least some of the feature game symbols. At least one of the feature game symbols is a switchable symbol symbol having a first state and a second state, and at least one is a switching symbol that changes the state of the switchable symbol. The controller causes the symbol selection pointer to randomly select one of the feature game symbols. There are two ways to change the state of the switchable symbol. Selecting the switchable symbol changes its state. Selecting the switching symbol causes the switchable symbol to also change its state.

20 Claims, 8 Drawing Sheets

Related U.S. Application Data

(60) Provisional application No. 61/435,398, filed on Jan. 24, 2011.

(56) References Cited

U.S. PATENT DOCUMENTS

| | | | | |
|---|---|---|---|---|
| 2008/0113736 | A1* | 5/2008 | Shackelford | G07F 17/3211<br>463/20 |
| 2009/0275387 | A1 | 11/2009 | Yoshizawa | |
| 2010/0248810 | A1 | 9/2010 | Sum et al. | |
| 2010/0304831 | A1 | 12/2010 | Suda et al. | |
| 2012/0190424 | A1* | 7/2012 | Bartosik | G07F 17/32<br>463/20 |

* cited by examiner

N2011P993US

3/8

GAMING MACHINE, SYSTEM AND METHOD FOR PLAYING A FEATURE GAME

PRIORITY CLAIM

This application claims the benefit of U.S. Provisional Application No. 61/435,398, filed 24 Jan. 2011, and is a continuation of co-pending U.S. patent application Ser. No. 13/022,702, filed 8 Feb. 2011, these patent applications are incorporated herein by reference.

FIELD OF THE INVENTION

The invention pertains to gaming machines including slot machines, and particularly to slot machines having bonus game features.

BACKGROUND OF THE INVENTION

In the gaming machine industry, there is a continuing need for gaming machine manufacturers to produce new types of games, or enhancements to existing games, which will attract frequent play by enhancing the entertainment value and excitement associated with the game. Presently there is a trend with slot machines to offer additional games that can be played, in addition to standard game play involving spinning reels. These additional games are often referred to as a "feature game", or "bonus game".

US 2010/0304831 A1, to Suda et al. shows a slot machine having an array of symbols displayed for both primary and secondary (e.g. bonus) game play. The feature game play is entered upon the occurrence of a selected event or outcome of the basic game. In particular, Suda describes using a subset of columns to indicate whether feature game capability is achieved. In one embodiment, the columns in which scatter symbols appear are selected for feature game purposes. A "scatter symbol" is a symbol that indicates some kind of special bonus, or bonus play.

US 2009/0275387 A1, to Yoshizawa, discloses a slot machine that displays a matrix of symbols as part of the primary game play and secondary game play occurs where the symbols are classified according to background color. The symbols having a common background color are grouped and re-positioned adjacent to each other on the display. In other words, symbols positioned once on a display are repositioned so as to gather the symbols with the same background color. Yoshizawa confirms that background effects can be an important part of gaming experience, particularly with secondary or feature game play.

The gaming industry is competitive and ever-evolving. Although many games continue to entertain gaming enthusiasts, there is still an unmet need for better and more interesting games and features. There is also an unmet need for making gaming experience user-friendly to enable a player to readily understand the various gaming features and variations available, particularly with respect to feature games that follow different rules than standard slot machine reel play.

SUMMARY OF THE INVENTION

A gaming machine includes a housing having a user interface, a lower display and an upper display, and a controller mounted in the housing and in communication with the lower display and the upper display. The controller enables standard game play mode until the occurrence of a predetermined event, such as the appearance of three scatter symbols.

The controller enables feature game play mode and causes the displays to present a feature game. In feature game play mode, the lower display presents a plurality of symbols, and a symbol selection pointer, and the upper display presents a landscape including symbols corresponding to at least some of the symbols presented on the lower display.

At least one of the symbols of the lower display is a switchable symbol having a first state and a second state. The controller causes the symbol selection pointer to select one of the plurality of symbols and when the switchable symbol is selected then the switchable symbol changes from the first state to the second state.

The controller causes the symbol selection pointer to again select one of the plurality of symbols. When the switchable symbol is again selected then the switchable symbol changes from the second state to the first state and the feature game play mode is terminated.

DETAILED DESCRIPTION

Figure 1A:
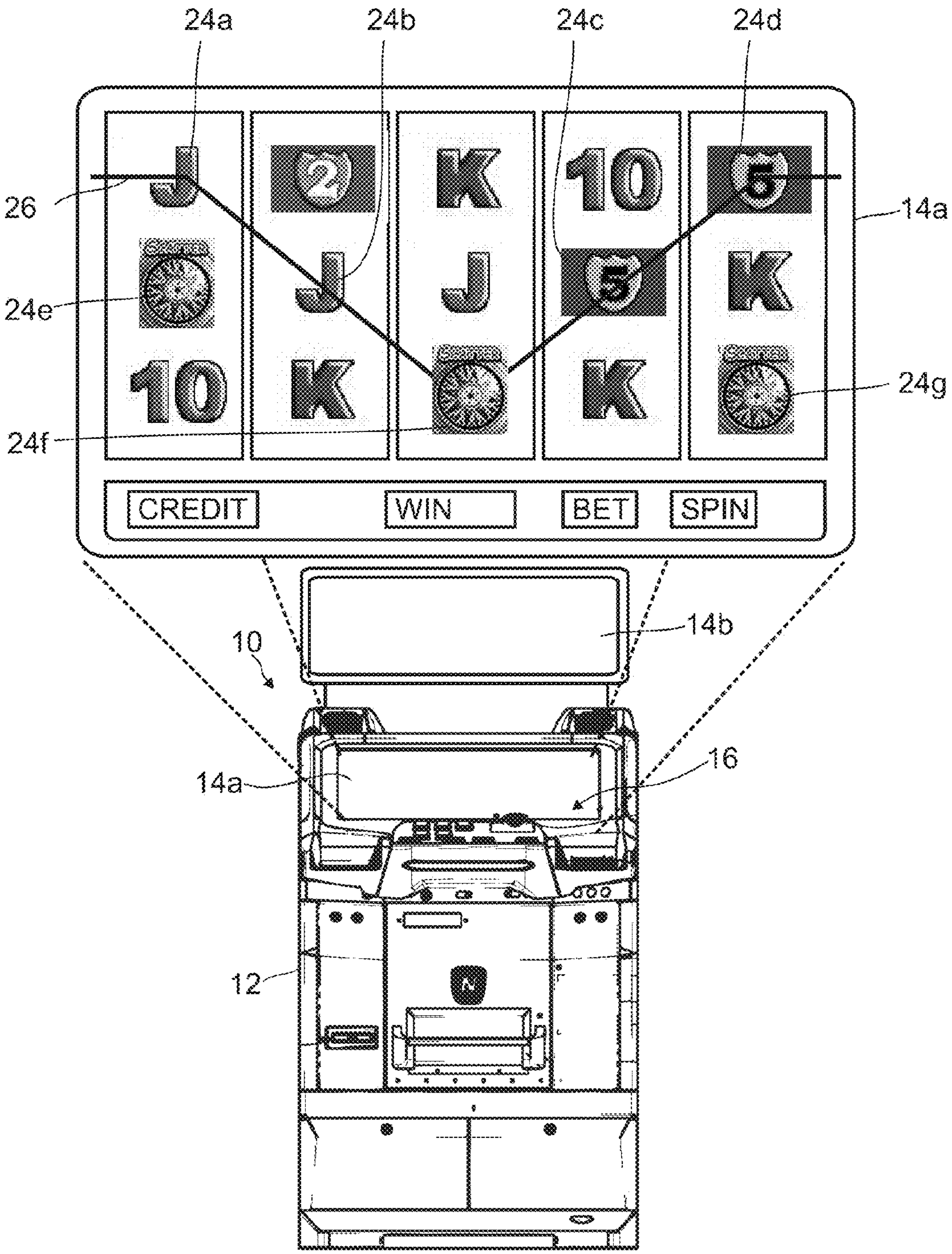
FIG. 1*a* is a front view of a housing displaying a slot machine reel.
Figure 1B:
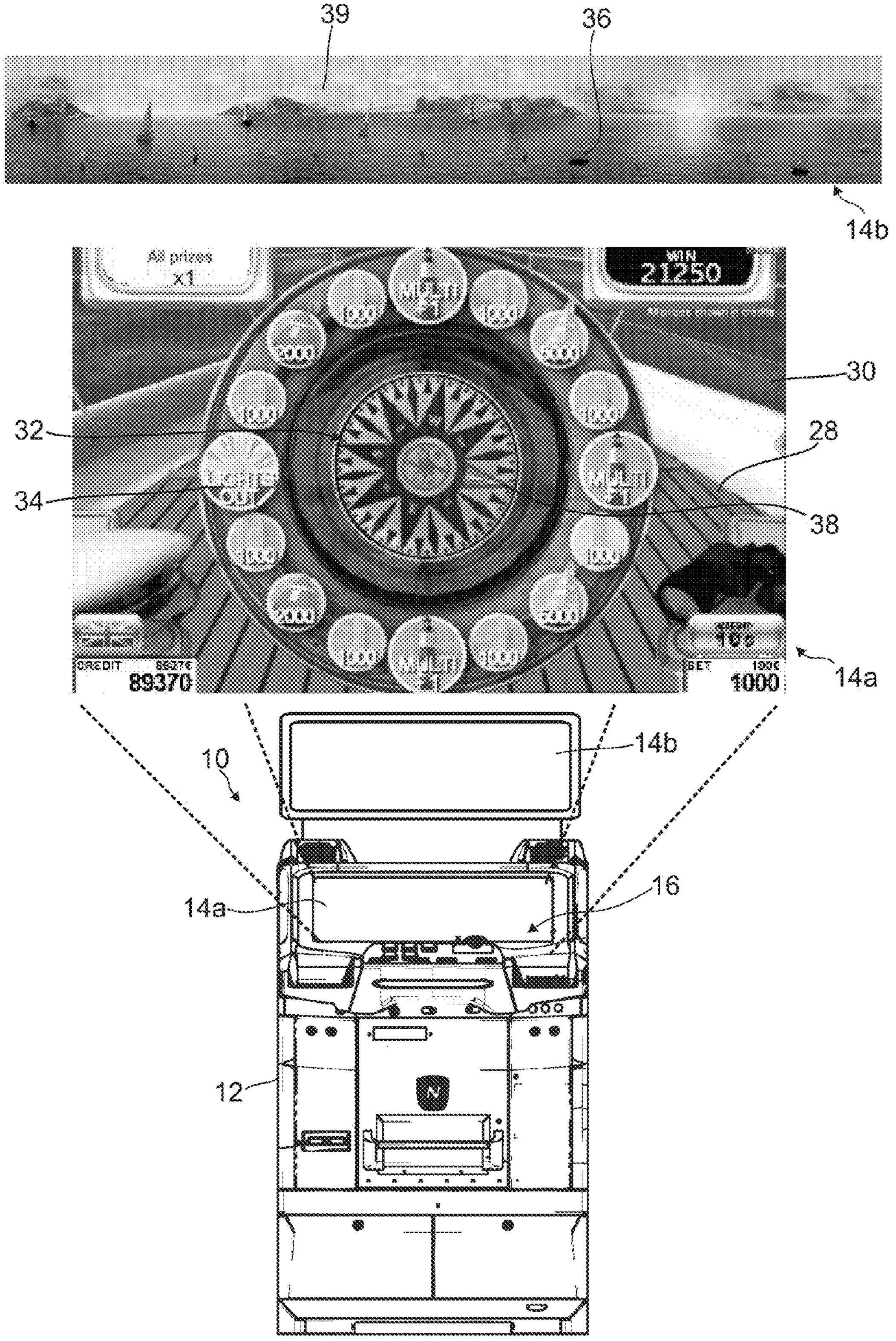
FIG. 1*b* is a front view of the housing of FIG. 1 displaying a feature game.

FIG. 1 shows a gaming machine 10. The gaming machine 10 is capable of various game play modes. Initially the gaming machine 10 operates in standard game play mode until the occurrence of a random event, and then the gaming machine 10 operates in a feature game play mode. In standard game play mode a matrix of symbols are displayed in a format including five reels oriented in columns and three horizontal rows. The reels in one embodiment are physical reels that spin, and in another embodiment, the reels are images of physical reels.

The gaming machine 10 includes a housing 12 with a lower display 14*a*, an upper display 14*b* and a user interface 16. The gaming machine 10 is preferably a slot machine. Slot machine is broadly construed as any gaming machine that is capable of enabling a player to play for entertainment with a probability of a payout.

The interface 16 is supported by the housing 12. The interface 16 faces a user, who may be standing or sitting in proximity to the machine 10. The interface 16 enables user input to initiate and continue game play. In particular, any of a number of buttons can be presented on the interface to enable a user to commence standard game play mode, feature game play mode, and to select particular bets.

The display 14*a* is configured to display a matrix of symbols 26 that imitate mechanical slot machine reels in standard game play mode according to one aspect of the invention. Accordingly, each column of the matrix of symbols imitates a single mechanical slot machine reel. The display 14*a* is angled with respect to the floor to face a user.

In another embodiment of the invention, the display 14*a* includes mechanical slot machine reels. It can be appreciated that hybrid arrangements having both digital and mechanical components are contemplated herein. The display 14*b* is transmissive to facilitate highlighting of any of the various symbols, and paylines to facilitate game play.

The matrix of symbols 26 has three rows and five columns. The matrix of symbols 26, however, may include any number of rows and columns in accordance with various game formats. As shown, the matrix of symbols 26 includes a plurality of symbols 24*a*, 24*b*, 24*c* and 24*d*, and three scatter symbols 24*e*, 24*f* and 24*g*.

In one aspect of the invention, the gaming machine 10 presents a poker-style game. The matrix of symbols 26 includes playing card values, such as King, Jack, Queen, and various numerical card values. The matrix of symbols 26 may also include any other symbols that create interest to a player including the scatter symbols 24*e*, 24*f* and 24*g*, these scatter symbols 24*e*, 24*f* and 24*g* display an image of a compass rose. Although a poker-based theme is described herein, it can be appreciated that the present invention also encompasses non-poker based themes.

The symbols 24 can include still images, or video-streamed images, or a combination of thereof. Such still images, or video streamed images, or any combination thereof, may be displayed using physical reels or virtual reels. Video streamed images enable the symbols 24 to yield an evolving appearance. In particular the size, character and transparency of the symbols may change during game play, particularly upon the appearance of a scatter symbol. When physical reels are used, the images may be highlighted or change by using a projection using transmissive technology on the display 14*a*.

The display 14*a* shows a payline 26 crossing a pair of jacks, a pair of 5's and a single scatter symbol 24*f*. The payline 26 is projected on the display 14*a* and indicates a payout. According to game play rules, where three scatter symbols appears in standard game play mode, a feature game play mode is initiated. Here scatter symbols 24*e*, 24*f* and 24*g* appear and enable feature game play so that the payout according to the payline 26 has a chance of being multiplied by the feature game play. Preferably, feature game play mode is automatically initiated, and accepted by enabling a user to activate a button on the interface 16. The matrix of symbols disappears and is completely replaced by feature game play images when the gaming machine 10 enters feature game play mode. It can be appreciated, however, that variants of the invention can retain a portion of the information and symbolism presented from standard game play mode in the feature game play mode, such as a bet amount.

FIG. 2 shows the gaming machine 10 in feature game play mode. The display 14*a* and 14*b* are each enlarged and duplicated above the gaming machine to enable details of each display 14*a* and 14*b* to be shown in FIG. 2. In accordance with an exemplary embodiment of the invention, the feature game play mode is termed, "regatta feature", and the regatta feature game has a nautical theme. The bet amount and credit amounts in the feature game play mode are retained on the display from the standard game play mode.

The display 14*a* shows the bow of a yacht 28 on a background 30 including water. In the center of the display 14*a*, a compass rose 32 is shown. Surrounding the compass rose 32 sixteen bonus symbols 34 circumscribe the compass rose 32 in equal intervals. The sixteen bonus symbols 34 constitute the list or set of feature games symbols in this example. It can be appreciated that any number of bonus symbols 34 may be used, and that the arrangement of the bonus symbols can be varied in an arrangement other than circumscribing the compass rose 32.

The compass rose 32 has a pointer 38, which may point towards one of the bonus symbols 34. Although a compass rose 32 is shown, any device utilizing a pointer may be used in accordance with variants of game play.

The display 14*b* displays a landscape 39 having water. A plurality of bonus symbols 36 are displayed on the landscape 39. Each bonus symbol 36 corresponds to a bonus symbol 34 of the display 14*a*.

In one embodiment of the invention, each bonus symbol 36 is an object that duplicates or recognizably resembles a bonus symbol 34 of the display 14*a*. The bonus symbols 36 are sequenced to correspond with the bonus symbols 34 of the display 14*a*. As shown, the bonus symbols 34 and 36 are objects that include buoys, light houses, yachts, and the sun. Although the objects used for bonus symbols are nautical in nature, any bonus symbols can be used in accordance with the theme and character of any feature game generated by the gaming machine 10.

Figure 2A:
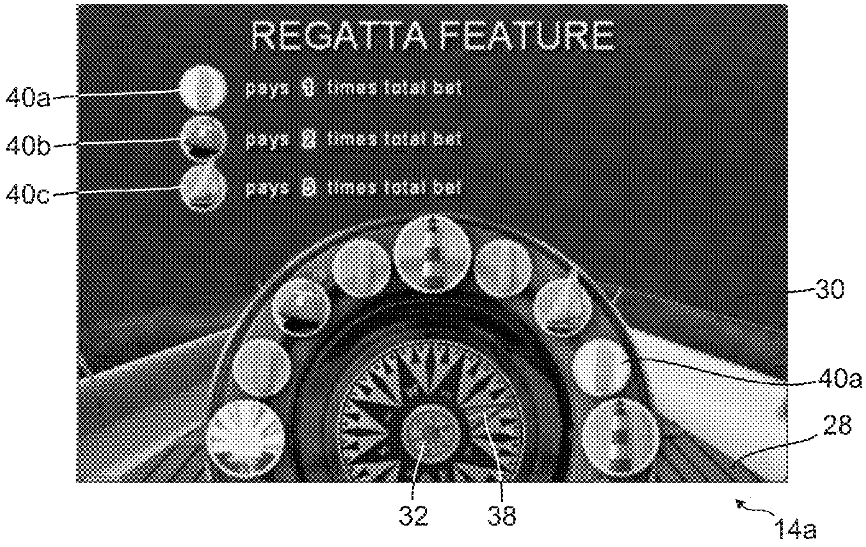
FIG. 2*a*-FIG. 2*d* show a front view of a display showing feature game play.

FIG. 2*a* is a screen shot of the display 14*a* in feature game play mode indicated by the text "REGATTA FEATURE" and by the image of the background 30 shown in conjunction with the bow 28 of a yacht.

The display 14*a* shows the text, "pays 1 times total bet" adjacent the symbol 40*a*, and shows the text, "pays 2 times total bet" adjacent the symbol 40*b*, and shows the text, "pays 5 times total bet" adjacent the symbol 40*c*. Each symbol 40*a*, 40*b* and 40*c* depicts an object. Here symbol 40*a* depicts a lighthouse, 40*b* depicts a buoy, and 40*c* depicts a yacht.

The compass rose 36 spins in response to a user activating a button on the user interface, and when the compass rose 36 stops, the pointer 38 points towards a symbol circumscribing the compass rose 36. As shown, the pointer 38 points towards the symbol 40*a*, which is a lighthouse, indicating that a payout determined by the standard game play mode will be multiplied by one.

It can be appreciated that any symbol can be colored to differentiate from other symbols. For example, a green lighthouse can invoke a different multiplier than a yellow lighthouse, for example.

Figure 2B:
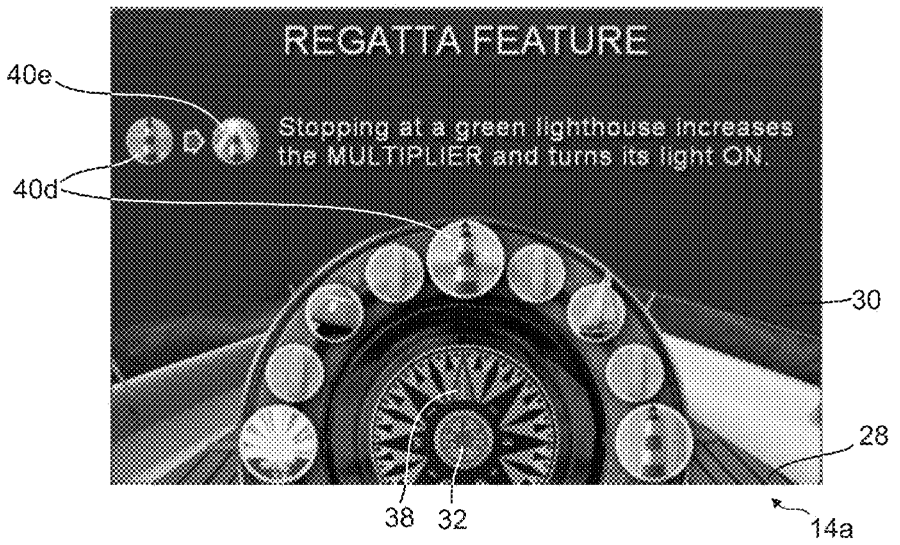

FIG. 2*b* is a screen shot of the display 14*a* in feature game play mode indicated by the text "REGATTA FEATURE" and by the image of the background 30 shown in conjunction with the bow 28 of a yacht.

The text, "Stopping at a green lighthouse increases the MULTIPLIER and turns its light ON." appears over the background 30. The green lighthouse symbol 40*d* is the switchable symbol 40*a* in the first state. The symbol 40*d* and the symbol 40*e* are displayed adjacent the text. The symbol 40*d* depicts a green lighthouse, and the symbol 40*e* depicts the green lighthouse that is highlighted by illumination. Thus the green lighthouse switches states from non-illuminated in the first state to illuminated in the second state.

The compass rose 32 spins, with the spin initiated by a user. The compass rose 32 may stop at a random position respectively based on a random event and the pointer 38 may in this example point towards the symbol 40*d*, which indicates that a multiplier associated with the green lighthouse symbol 40*d* is now active and increased from a previous multiplier value to result in a new multiplier value. The multiplier value may be one of a natural number, an integer, a real number or a rational number. The multiplier value may be increased by an integer value one (+1). The switchable symbol 40*d* in this situation is switched from the first state to the second state, wherein in order to indicate that the switchable symbol 40*d* is in the second state the switchable symbol 40*d* also becomes highlighted with illumination to also particularly indicate that the multiplier associated with the green lighthouse symbol 40*d* is active.

Figure 2C:
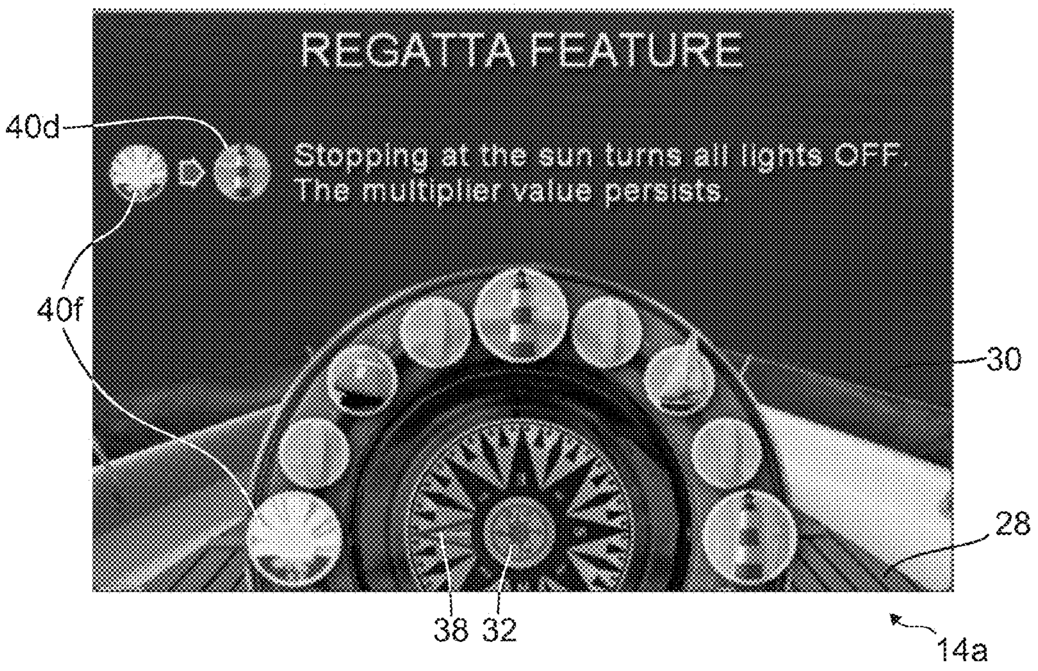

FIG. 2*c* is a screen shot of the display 14*a* in feature game play mode indicated by the text "REGATTA FEATURE" and by the image of the background 30 shown in conjunction with the bow 28 of a yacht.

The text, "Stopping at the sun turns all lights OFF. The multiplier value persists." appears on the background 30. The symbols 40*d* and 40*f* appear adjacent the text. The symbol 40*f* depicts the sun, which in this case is the switching symbol 40*f* (sun). The pointer 38 points at the switching symbol 40*f*, causing highlighting of the symbol 40*d*, the green lighthouse, to cease. In other words, the state of the switchable symbol 40*d* (lighthouse) is modified in that if the switchable symbol 40*d* (lighthouse) is in the second state then the switchable symbol 40*d* (lighthouse) is switched to the first state. The multiplier associated with the green lighthouse, however, remains active and the player is enabled to have another turn at spinning the compass rose 32.

Figure 2D:
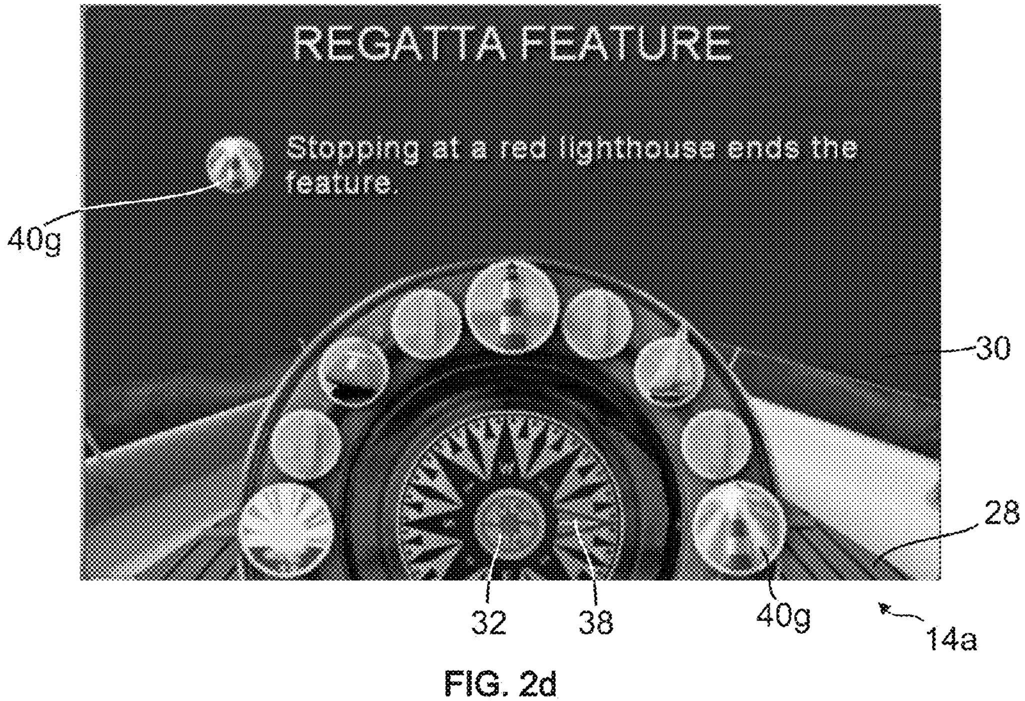

FIG. 2*d* shows the display 14*a* in feature game play mode indicated by the text "REGATTA FEATURE" and by the image of the background 30 shown in conjunction with the bow 28 of a yacht.

The text, "Stopping at a red lighthouse ends the feature." appears on the background 30. The symbol 40*g* appears adjacent the text. The pointer 38 points at the symbol 40*g*, which is the switchable symbol 40*d* in the second state, causing the regatta feature to terminate. In other words, if the switchable symbol 40*d* is in the second state then the feature game mode is terminated. The game play returns to standard game play mode as shown in FIG. 1*a*.

Figure 3:
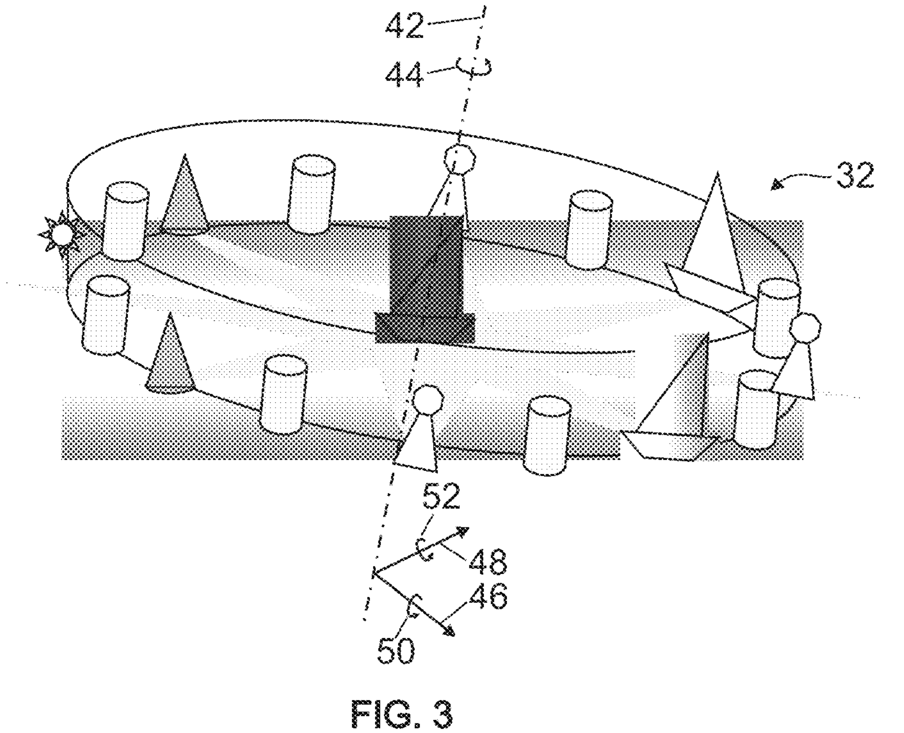
FIG. 3 is a perspective view of a compass rose in accordance with the present invention.

FIG. 3 shows the compass rose 32 rotating around the axis 42 in the direction of the arrow 44. The compass rose 32 also slightly rotates, or tilts, around the axis 46 and the axis 48 in the direction of the arrows 50 and 52, respectively. Rotational movement of the compass rose 32 around the axis 42 facilitates game play. Movement of the compass rose 32 around the axis 46 and 48 provides a visual effect resembling the natural movement of a nautical compass during use. For example, a common type of nautical compass enables the compass pointer to remain visible to a user during passage through rough waters by allowing the compass rose to float in a water-filled case. The display of the present invention allows for "floating" of the compass rose 32 by allowing the compass rose 32 to gently rotate back and forth around the axis 46 and the axis 48.

Figure 4:
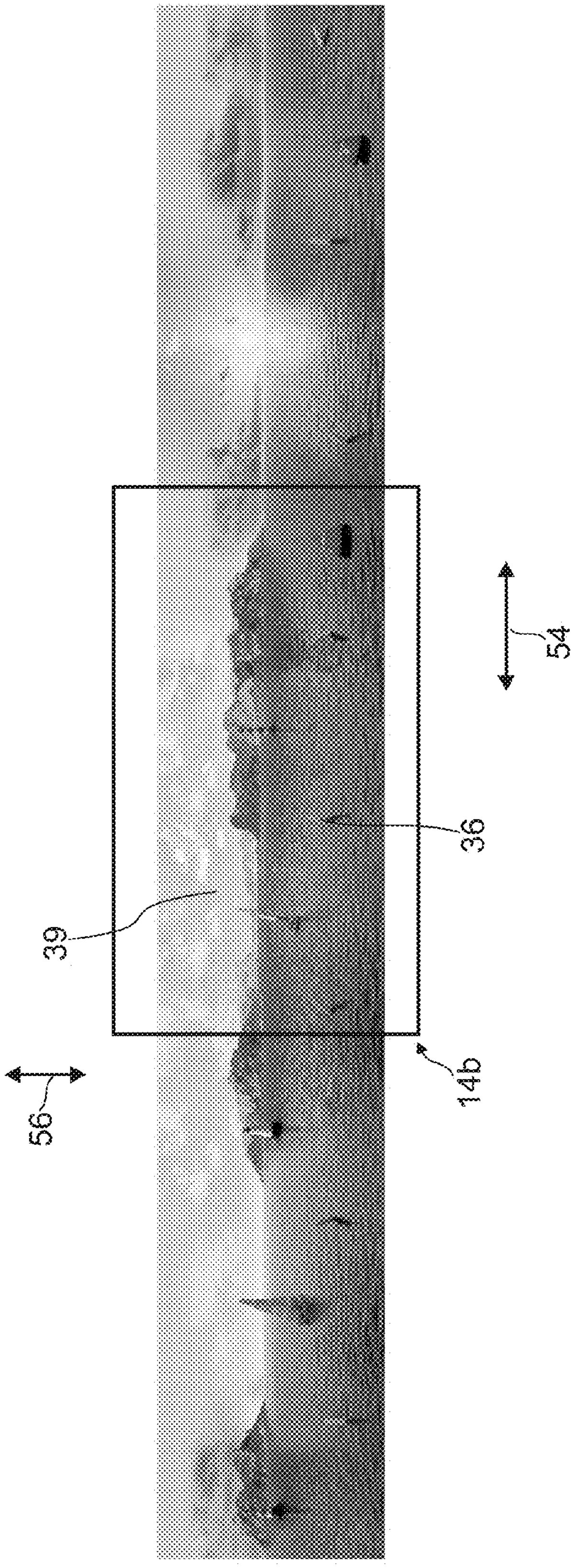
FIG. 4 is front view of a landscape in accordance with the present invention.

FIG. 4 shows the background 38 with a portion of the background 38 appearing within the visible area of the display 14*b*. The background 38 pans laterally across the display 14*b* in the directions of the arrow 54 in response to rotation of the compass rose 32 during game play. In this way the background 38 corresponds to a view in the direction indicated by the pointer 38.

The background 38 also pans up and down in generally sinusoidal fashion in the directions of the arrows 56 and 54 to imitate the movement of the bow 28 of the yacht across wavy waters. The floating movement of the compass rose depicted in FIG. 3, thus corresponds with this sinusoidal movement. The sinusoidal movement in the direction of the arrows 56 has a different frequency and amplitude than the sinusoidal movement in the direction of the arrows 54.

Figure 5:
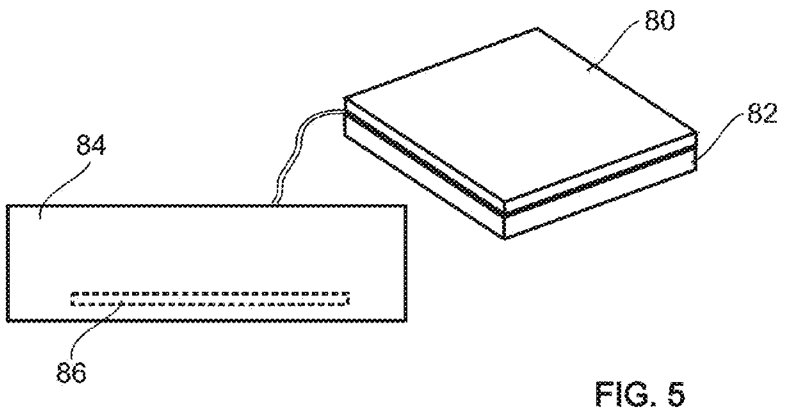
FIG. 5 shows a computer and a display interface in accordance with the present invention.

FIG. 5 shows the computer 84, which mounts in the housing 12 of the gaming machine 10 and the computer 84 connects with a display 80. The display 80 includes a transmissive LCD panel and may include an integrated touch-screen 82. The computer includes a main board 86 having a controller, memory connected to the main board for storing software, software stored in the memory for operating the display 80, software drivers, and a main processor. In a preferred embodiment, the computer 84 includes two displays 80 to form an upper display and a lower display.

Figure 6:
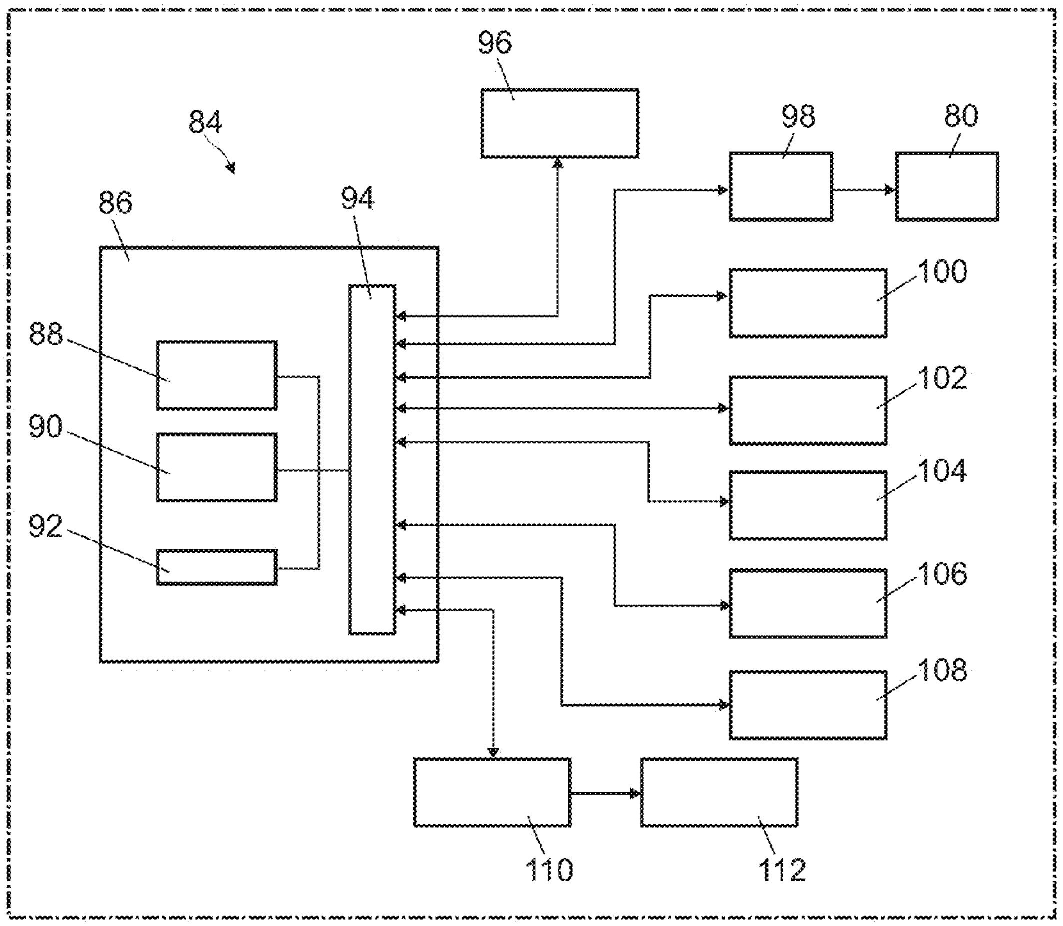
FIG. 6 is a system diagram in accordance with the present invention.

FIG. 6 shows a system diagram of the computer 84. The computer 84 includes a main board 86, program memory 88 being a computer readable medium, a main processor 90 and RAM 92 connected in operative communication. The computer 84 has an input output I/O controller 94. The I/O controller 94 communicates with a user interface control panel 96, display interface driver circuitry 98, a display unit 100, a coin acceptor 102, a bill acceptor 104, a card reader 106, a ticket reader/printer 108, and a sound circuit 110. The sound circuit 110 is in operative communication with speakers 112.

The coin acceptor 102 and the bill acceptor 104 accept currency and communicate the amount accepted to the I/O controller 94. The card reader 106 reads credit cards, debit cards, gift cards or other card having electronic indicia of monetary value.

The ticket reader 108 prints tickets and receipts revealing the winnings of a player, or other financial outcome. The ticket reader 108 also receives tickets having indicia of monetary value, such as a bar code, which is read by the ticket reader 108.

The sound circuit 110 is configured to provide an acoustic-based interface for the user. Each movement or action by a user may result in a particular sound, or instruction being generated by the computer 84. The speakers 112 communicate the sounds to the user.

Game Play Example

During exemplary game play, the appearance of three or more scatter symbols in standard game play mode triggers the bonus play mode termed "regatta feature". During the regatta feature, a ring of sixteen symbols are displayed circumscribing the compass rose. Accordingly, there are sixteen random stop positions for the pointer of the compass rose. Twelve of the sixteen positions have prizes the other four positions have special purposes.

The following table illustrates the various symbols and their effect on game play when the regatta feature is active.

| Symbol | Function | Angle (1024 increments of rotation) |
|---|---|---|
| Yellow buoy | Multiplier: 1 × Total bet | 64, 192, 320, 448, 576, 704, 832, 960 |
| Orange bouy | Multiplier: 2 × Total bet | 640, 896 |
| Yacht | Multiplier: 5 × Total bet | 128, 384 |
| Lighthouse | Multiplier: 10 × Total bet or Terminate Feature Mode | 0, 256, 512 |
| Sun | Reset Lighthouses | 768 |

Lighthouses: The lighthouses are switchable symbols. There are three lighthouses displayed. When the compass rose spins and the pointer points to a lighthouse it increases the multiplier and turns on the light of the lighthouse, thus the lighthouse is switchable between a first state that is unilluminated, and a second state that is illuminated. When an illuminated lighthouse is hit again, the feature game ends.

Sun: The sun symbol is a switching symbol that resets the lighthouses, but leaves the multiplier unchanged. This enables the multiplier to persist. The player can spin the compass rose again. Selecting the sun symbol, which is a switching symbol, does not terminate the feature game in this example.

While the compass spins, the landscape is panned on the upper screen according to the position of the compass rose. Importantly, the view from the yacht is placed on both screens. A portion of the yacht appears on the lower display, and the horizon containing the landscape is displayed on the upper screen. The landscape on the upper screen appears to move, when the compass spins. The symbols circumscribing the compass rose correspond to and are represented on the landscape.

On the lower screen, there is a view of the yacht from the steering wheel, looking to the bow. The railing should nearly touch the upper edge of the screen. At the lower centre position, there is the compass rose (the wheel of fortune). Next to it, there should be some displays, showing the above mentioned pay table.

On the upper screen, there is a landscape, spinning around when the yacht is turning. The horizon should be at about the centre of that screen, to keep the landscape small in height.

Compass Rose: The compass rose contains 16 positions in sequence, starting from the north, clockwise:

| Position | Symbol |
|---|---|
| 1 | Lighthouse |
| 2 | Buoy-yellow cylindrical |
| 3 | Yacht_1 |
| 4 | Buoy-yellow cylindrical |
| 5 | Lighthouse |
| 6 | Buoy-yellow cylindrical |
| 7 | Yacht_2 |
| 8 | Buoy-yellow cylindrical |
| 9 | Lighthouse |
| 10 | Buoy-yellow cylindrical |
| 11 | Buoy-orange cone shaped |
| 12 | Buoy-yellow cylindrical |
| 13 | Sun |
| 14 | Buoy-yellow cylindrical |
| 15 | Buoy-orange cone shaped |
| 16 | Buoy-yellow cylindrical |

Landscape: To minimize the amount of memory storage needed, the landscape is presented as a single long image stored in memory. The landscape represents the view from the yacht in full 360°. The picture is panned and zoomed to a specific position according to the pointer on the compass rose to enable the upper display to have the effect that the yacht is moving e.g. turning, or moving forward.

The landscape may include any of: a harbour, a city, islands, clouds, and mountainous regions. The upper display shows the final projected position of the various symbols, which correspond with the symbols circumscribing the compass rose. There can be one or more particular landscapes presented randomly, or in sequence, to a user depending on game play rules.

The compass rose rotation is initiated by a user by toggling the game interface. The compass rose may turn either clockwise or counter-clockwise. Optimally the compass rose turns in a direction that yields a spin of between a half and a full spin. The position of the compass rose corresponds to the position of the landscape displayed on the upper screen. There is a linear relationship between the angle of the compass rose and the shift of the upper screen. Rotation of the compass rose starts and stops slowly, and in one embodiment may take at least five seconds to complete its movement. Preferably the symbols circumscribing the compass rose are stationary.

Bonus Calculations:

The initial multiplier is an integer value one (1). The multiplier is multiplied by the total bet made by a player, typically chosen initially during standard game play. When a non-lit lighthouse is the stop-symbol, the multiplier is increase by one and the lighthouse is lit. When the stop-symbol is a lit lighthouse, the multiplier is 10 so that a prize of 10 times the total bet is paid and the feature game play ends. When the stop-symbol is the sun, all lighthouses are reset to non-lit and the feature game persists.

The symbols, in addition to providing for multipliers to increase a payout, also provide for prizes that can be immediately awarded to a player. The prize for a yellow, cylindrical buoy is 1. The prize for an orange, cone-shaped buoy is 2. The prize for a yacht is 5. Each prize can be multiplied times the total bet. Each prize can be additionally multiplied by a multiplier, when a multiplier is active.

Figure 7:
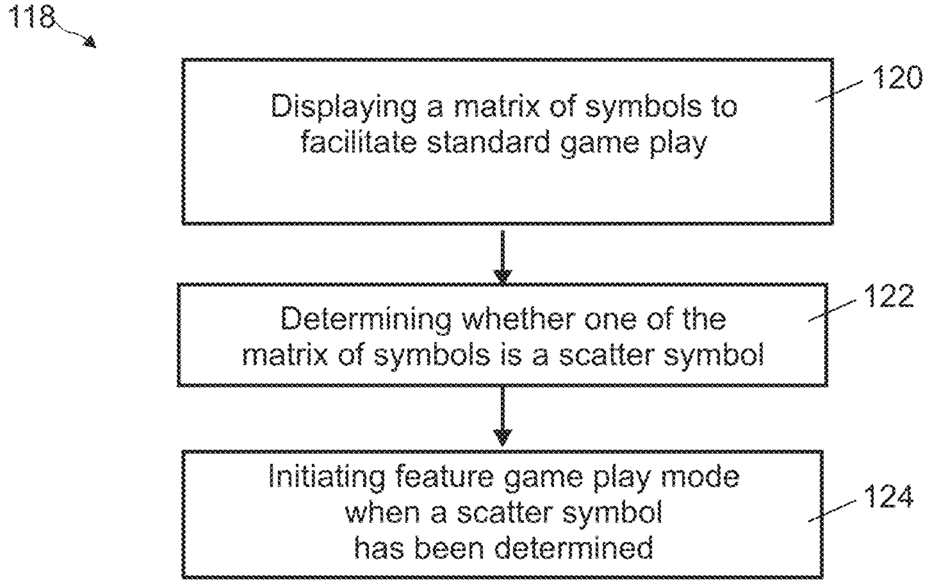
FIG. 7 is a flowchart showing a method in accordance with the present invention.

FIG. 7 shows the method 118 in accordance with the present invention. The method 118 includes the step 120 of displaying a matrix of symbols to facilitate standard game play mode. The matrix of symbols, are represented on slot machine reels in accordance with one embodiment of the invention.

The step 122 determines whether one of the matrix symbols is a scatter symbol. In one embodiment of the present invention, the scatter symbol has the text "scatter" and an image of a compass rose. (see FIG. 1) It can be appreciated, however, that the scatter symbol need not have text, and the image can be any object.

The step 124 initiates feature game play mode when a scatter symbol has been determined.

Figure 8:
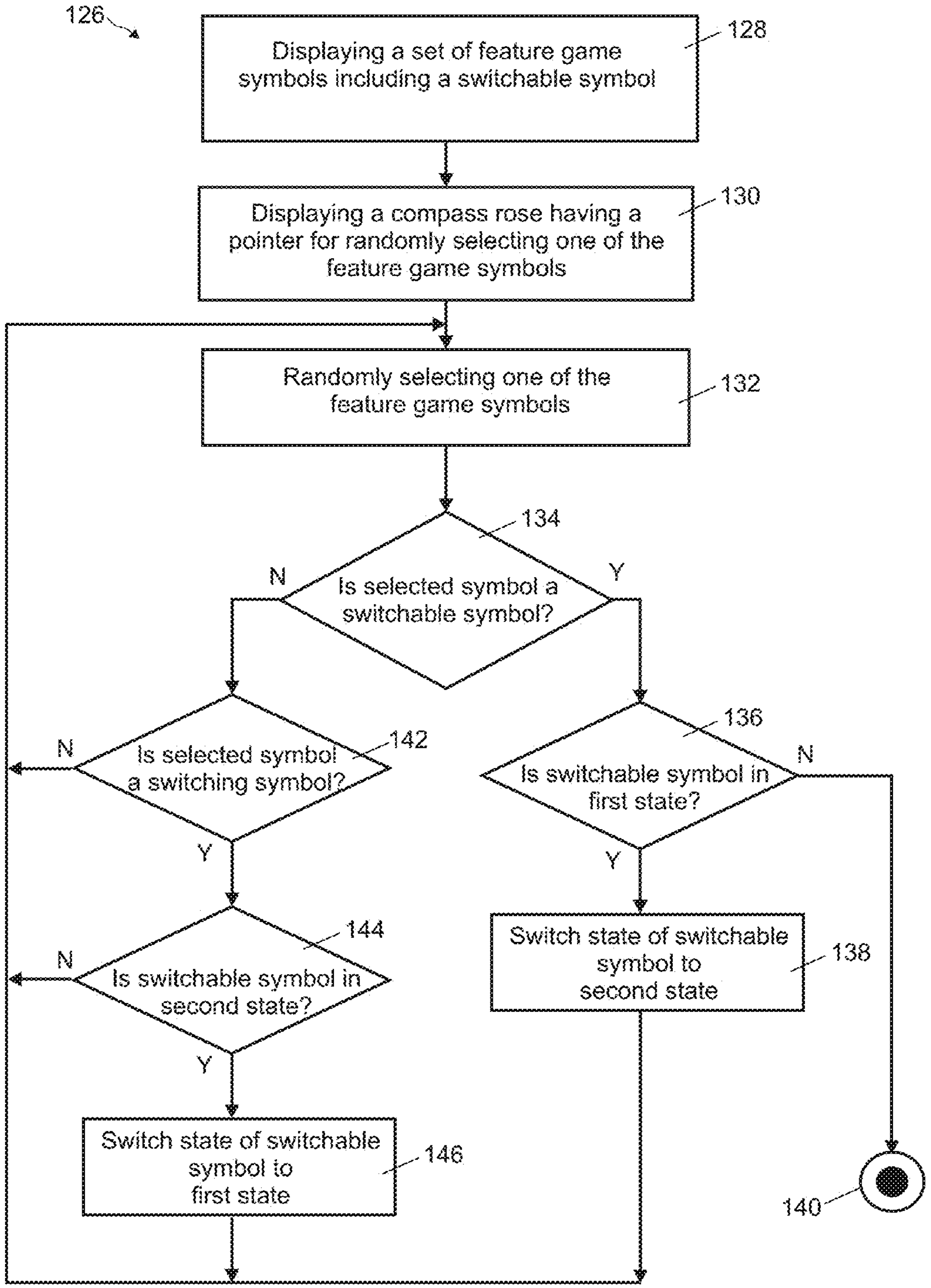
FIG. 8 is a flowchart showing a method in accordance with the present invention.

FIG. 8 shows an exemplary method of game play 126 including aspects of feature game play mode. The method 126 includes the step 128 of displaying a set of feature game symbols including a switchable symbol. In accordance with one aspect of the invention, the switchable symbol is a lighthouse that is highlighted by illumination when its state switches from a first state to a second state.

The step 130 displays a compass rose having a pointer for randomly selecting one of the feature symbols. The term "randomly" is purely random in one variant of the invention. The terms "randomly" and "random" are, however, intended to include the possibility of providing simply an appearance of randomness in accordance with prevailing standards of the casino gaming industry. Accordingly, these terms are to be broadly construed.

The step 132 randomly selects one of the feature game symbols. Preferably the compass rose rotates and directs the pointer at one of the feature game symbols, which circumscribes the compass rose.

The step 134 determines whether the selected symbol is a switchable symbol. If the step 134 determines that the selected symbol is a switchable symbol then the step 136 determines whether the switchable symbol is in the first state, which is non-illuminated. If the switchable symbol is in the second state, being illuminated, the step 140 terminates the feature game mode. If the switchable symbol is in the first state, the step 138 changes the switchable symbol to the second state, which is illuminated and feature game play continues with the step 132 of randomling selecting one of the feature game symbols.

If the step 134 determines that the selected symbol is not a switchable symbol, then the step 142 determines whether the selected symbol is a switching symbol, for example, the sun symbol in this example, If the selected symbol is a switching symbol, then the step 146 switches the state of the switchable symbol to the first state and feature game play commences with step 132 of randomly selecting one of the feature game symbols. If the selected symbol is not a switching symbol, then feature game play commences with step 132 of randomly selecting one of the feature game symbols. It is important to understand that the terms "illuminated" and "non-illuminated" are terms relative to each other so that in the second state, the switchable symbol is relatively brighter than the switchable symbol in the first state. Non-illuminated, can include partial illumination so long as the illumination intensity of the second state is noticeably greater than the illumination, or partial illumination, of the first state. This is particularly true of any game that is displayed on a transmissive display, or any other electronic display.

Further, variants of game play are possible, and the present description of a particular game is given by way of example only. The present invention is intended to include numerous ways of playing a casino game, particularly with feature mode games. For example, there can be more than one feature game mode available, each being triggered by a particular switchable symbol in standard game play mode.

While the switchable symbol is depicted as a lighthouse and the switching symbol is depicted as the sun in the exemplary game, any type of graphical or video representation can be used as the switching symbol and the switchable symbol, respectively. The choice of symbolism is a matter of game theme and design choice. For example, while a nautical theme has been chosen, other themes including military vehicles, aircraft, spacecraft, other motor vehicles and recreational mobility devices such as skis can be used, depending on the game theme. Where the theme is outer space-related, the background may include planets and celestial objects, the switchable element might be a star, pulsar etc., and the switching element might be a black hole for instance.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural references unless the context clearly dictates otherwise. It should also be noted that the term "or" is generally employed in its sense including "and/or" unless the context clearly dictates otherwise.

The headings and the Abstract provided herein are for convenience only and do not interpret the scope or meaning of the embodiments.

It will be readily apparent to one of ordinary skill in the art that the various processes described herein may be implemented by, e.g., appropriately programmed general purpose computers, special purpose computers and computing devices. Typically a controller unit includes one or more microprocessors, one or more microcontrollers, one or more digital signal processors will receive instructions e.g., from a memory or like device, and execute those instructions, thereby performing one or more processes defined by those instructions.

A "processor" means one or more microprocessors, central processing units CPUs, computing devices, microcontrollers, digital signal processors, or like devices or any combination thereof.

Various embodiments can be configured to work in a network environment including the computer 84 that is in communication e.g., via a communications network with one or more devices. The computer 84 may communicate with the devices directly or indirectly, via any wired or wireless medium e.g. the Internet, LAN, WAN or Ethernet, Token Ring, a telephone line, a cable line, a radio channel, an optical communications line, commercial on-line service providers, bulletin board systems, a satellite communications link, a combination of any of the above. Any number and type of devices may be in communication with the computer.

In one embodiment, the present invention may be practiced on a network of one or more devices without a central authority. In such an embodiment, any functions described herein as performed by the server computer or data described as stored on the server computer may instead be performed by or stored on one or more such devices.

While the present invention is disclosed in terms of various specific embodiments, it can be appreciated that these embodiments are by way of example only. There are several variations contemplated by the present invention, and with the popularity of electronic gaming interfaces, the term "reel" should be broadly understood to include any set of moveable images, defining a matrix column, that are used to establish a payout. Accordingly, the scope of the invention is defined by the appended claims.

What is claimed is:

1. A gaming machine comprising:

a housing;

a game display, the game display being transmissive to facilitate highlighting of symbols, and a game controller arranged to control images displayed on the game display, the game controller being arranged to play a game in normal game play mode wherein a plurality of symbols are randomly selected from a predetermined set of symbols and displayed on the game display;

the game controller initiates a feature game mode if a scatter symbol is displayed, the feature game mode being characterized in that the game controller is programmed to:

determine a set of feature game symbols, the set of feature games symbols containing at least one switchable symbol that may be switched between a first state and a second state when the switchable symbol is randomly selected, the switchable symbol enables a multiplier after being randomly selected in the first state;

the set of feature games symbols containing at least one switching symbol, that switches the switchable symbol between the first state and the second state, and enables the multiplier to persist during normal game play mode, the switching symbol being a symbol other than the switchable symbol;

randomly select one symbol from the set of feature game symbols; and determine whether the randomly selected feature game symbol is the at least one switchable symbol in the second state and when the at least one switchable symbol is in the second state, feature game play mode terminates.

2. The gaming machine as set forth in claim 1, wherein the game display includes a lower display and an upper display positioned above the lower display.

3. The gaming machine as set forth in claim 2, wherein the lower display depicts a rotatable compass rose with three axes, the rotatable compass rose being at least slightly rotatable about each of the three axes, and the at least one switchable symbol is a lighthouse and the at least one switching symbol is a sun.

4. The gaming machine as set forth in claim 3, wherein the set of feature game symbols are arranged to circumscribe the rotatable compass rose to enable a pointer to point at one of the feature game symbols.

5. The gaming machine as set forth in claim 4, wherein the upper display depicts a landscape including water, and at least some of the set of feature game symbols are displayed on the upper display.

6. The gaming machine as set forth in claim 5, wherein the at least one switchable symbol in the second state is highlighted by illumination.

7. The gaming machine as set forth in claim 3, wherein when the at least one switchable symbol is in the second state, the gaming machine provides an opportunity for an increased payout that persists irrespective of further state transitions of the at least one switchable symbol.

8. A system for gaming comprising:

a gaming machine having a housing with a user interface, a lower display and an upper display, the lower display and the upper display, being transmissive to facilitate highlighting symbols;

a computer mounted in the housing and in communication with the lower display and the upper display, the computer includes a controller, a main board, a program memory and a main processor connected in operative communication;

the controller enables standard game play mode until the occurrence of a predetermined event;

upon occurrence of the predetermined event, the controller enables feature game play mode and causes the displays to present a feature game and to operate the gaming machine in feature game play mode to cause the lower display to present a plurality of feature game symbols, and a symbol selection pointer that randomly points to one the plurality of feature game symbols;

a switchable symbol having a first state and a second state, when the symbol selection pointer points to the switchable symbol in the first state, the switchable symbol changes to the second state and a multiplier is enabled, when the symbol selection pointer points to the switchable symbol in the second state feature game play mode terminates;

a switching symbol, which is other than the switchable symbol, when the symbol selection pointer points to the switching symbol, the switching symbol causes the switchable symbol to change state.

9. The system as set forth in claim 8, wherein the controller causes the upper display to display a plurality of symbols on the upper display, which correspond with at least some of the plurality of feature game symbols displayed on the lower display.

10. The system as set forth in claim 9, wherein the controller causes the upper display to display a landscape and causes the lower display to display at least a portion of the upper display landscape.

11. The system as set forth in claim 10, wherein the symbol selection pointer is displayed as part of a compass rose with three axes, the compass rose being at least slightly rotatable about each of the three axes, and the plurality of feature game symbols displayed on the lower display circumscribe the compass rose.

12. The system as set forth in claim 11, wherein the controller causes the lower display to display the switching symbol and causes the upper display to display a second switchable symbol, the second switchable symbol displayed on the upper display corresponds with the switchable symbol displayed on the lower display so that when the state of the switchable symbol of the lower display changes from the first state to the second state, the corresponding second switchable symbol of the upper display is highlighted.

13. The system as set forth in claim 12, wherein the second switchable symbol of the upper display is highlighted by illumination.

14. A gaming method having a standard and feature game play modes, comprising:

providing a transmissive display capable of highlighting symbols;

displaying a matrix of symbols on the transmissive display to facilitate standard game play mode;

determining whether one of the matrix of symbols is a scatter symbol;

initiating the feature game play mode when the scatter symbol has been determined, feature game play mode further comprising:

displaying a set of feature game symbols, the set of feature game symbols containing at least one switching symbol, and at least one switchable symbol that may be switched between a first state and a second state in response to said switching symbol;

displaying a pointer for randomly selecting one of the set of feature game symbols; randomly selecting one of the set of feature game symbols;

determining whether the randomly selected feature game symbol is the at least one switchable symbol in the first state, in which case the at least one switchable symbol is switched to the second state;

determining whether the randomly selected feature game symbol is the at least one switchable symbol in the second state, in which case the feature game play mode is terminated;

determining whether the selected feature game symbol is the at least one switching symbol, other than the at least one switchable symbol, in which case the at least one switching symbol causes the at least one switchable symbol to change state.

15. The method as set forth in claim 14, wherein the step of displaying a pointer includes displaying a compass rose.

16. The method as set forth in claim 15, wherein the step of displaying a set of feature game symbols includes circumscribing the compass rose with the set of feature game symbols.

17. The method as set forth in claim 16, wherein when the at least one switchable symbol in the second state enables a multiplier.

18. The method as set forth in claim 16, wherein the at least one switchable symbol in the second state yields an increased payout using a multiplier often.

19. The method as set forth in claim 17, wherein the standard game play mode commences after the feature game play mode is terminated.

20. The method as set forth in claim 17 further comprising determining whether the selected game feature symbol is the at least one switching symbol, and changing the state of the at least one switchable symbol when the selected feature game symbol is the at least one switching symbol, while enabling the multiplier to persist.

* * * * *